United States Patent
Lin et al.

(10) Patent No.: US 9,834,719 B2
(45) Date of Patent: *Dec. 5, 2017

(54) METHODS FOR SERVICING SUBTERRANEAN WELLS

(71) Applicant: Schlumberger Technology Corporation, Sugar Land, TX (US)

(72) Inventors: Lijun Lin, Sugar Land, TX (US); Quanxin Guo, Sugar Land, TX (US); Brent Busby, Richmond, TX (US); Philip F. Sullivan, Bellaire, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 173 days.

This patent is subject to a terminal disclaimer.

(21) Appl. No.: 13/627,904

(22) Filed: Sep. 26, 2012

(65) Prior Publication Data

US 2013/0025863 A1 Jan. 31, 2013

Related U.S. Application Data

(63) Continuation-in-part of application No. 13/301,240, filed on Nov. 21, 2011, and a continuation-in-part of application No. 13/603,367, filed on Sep. 4, 2012.

(Continued)

(51) Int. Cl.
*E21B 33/13* (2006.01)
*C09K 8/36* (2006.01)
(Continued)

(52) U.S. Cl.
CPC .............. *C09K 8/36* (2013.01); *C09K 8/12* (2013.01); *C09K 8/5083* (2013.01); *C09K 8/512* (2013.01);
(Continued)

(58) Field of Classification Search
CPC ....... E21B 21/003; E21B 33/138; C09K 8/512
See application file for complete search history.

(56) References Cited

U.S. PATENT DOCUMENTS 3,288,720 A 11/1966 Giorgio et al.
3,447,608 A * 6/1969 Fry et al. ................. 166/293
(Continued)

FOREIGN PATENT DOCUMENTS

EP 566028 10/1993
EP 0711252 B1 1/1998
(Continued)

OTHER PUBLICATIONS

Maltesh et al., "Effect of the degree of hydrolysis of polyacrylamide on its interactions with poly(ethylene oxide) and poly(vinylpyrrolidone)," Macromolecules, vol. 24, Feb. 11, 1991, pp. 5775-5778.*

(Continued)

*Primary Examiner* — Angela M DiTrani
*Assistant Examiner* — Andrew H Sue-Ako
(74) *Attorney, Agent, or Firm* — Michael L. Flynn; Robin Nava

(57) ABSTRACT

Pumpable process-fluid compositions comprise polyacrylamide, a non-metallic crosslinker and a pH-adjustment material. Such compositions have utility in the context of controlling lost circulation in subterranean wells. Upon entering at least one lost circulation zone, the compositions crosslink, thereby forming a barrier that minimizes or stops fluid flow from the wellbore into the lost circulation zone.

6 Claims, 4 Drawing Sheets

Related U.S. Application Data

(60) Provisional application No. 61/418,211, filed on Nov. 30, 2010.

(51) Int. Cl.
  *C09K 8/508* (2006.01)
  *C09K 8/512* (2006.01)
  *E21B 21/00* (2006.01)
  *C09K 8/12* (2006.01)

(52) U.S. Cl.
  CPC ........ *E21B 21/003* (2013.01); *C09K 2208/08* (2013.01); *C09K 2208/30* (2013.01)

(56) References Cited

U.S. PATENT DOCUMENTS

| | | |
|---|---|---|
| 3,483,706 A | 12/1969 | Taradash et al. |
| 3,488,720 A | 1/1970 | Coscia et al. |
| 3,504,499 A | 4/1970 | Taradash et al. |
| 3,507,847 A | 4/1970 | Coscia et al. |
| 3,776,310 A | 12/1973 | Norton et al. |
| 3,779,914 A | 12/1973 | Nimerick |
| 4,069,161 A | 1/1978 | Pogers |
| 4,101,501 A | 7/1978 | Hinterwaldner |
| 4,137,970 A | 2/1979 | Laflin et al. |
| 4,183,406 A | 1/1980 | Lundberg et al. |
| 4,246,124 A | 1/1981 | Swanson |
| 4,258,790 A | 3/1981 | Hale |
| 4,277,580 A | 7/1981 | Allen et al. |
| 4,385,935 A | 5/1983 | Skjeldal |
| 4,391,925 A | 7/1983 | Mintz et al. |
| 4,441,556 A | 4/1984 | Powers et al. |
| 4,460,751 A | 7/1984 | Hanlon et al. |
| 4,461,352 A | 7/1984 | Falk |
| 4,509,985 A | 4/1985 | Davidovits et al. |
| 4,521,452 A | 6/1985 | Highsmith |
| 4,613,631 A * | 9/1986 | Espenscheid .......... C09K 8/512 106/200.1 |
| 4,643,255 A | 2/1987 | Sandiford et al. |
| 4,663,366 A | 5/1987 | Drake et al. |
| RE32,742 E | 9/1988 | Skjeldal |
| 4,773,481 A | 9/1988 | Allison et al. |
| 4,836,940 A * | 6/1989 | Alexander ................... 507/119 |
| 4,859,367 A | 8/1989 | Davidovits |
| 4,898,242 A | 2/1990 | Jennings, Jr. |
| 4,923,829 A | 5/1990 | Yasutomi et al. |
| 4,933,031 A | 6/1990 | Blomberg et al. |
| 4,935,060 A | 6/1990 | Dingsoyr |
| 5,007,480 A | 4/1991 | Anderssen |
| 5,048,605 A | 9/1991 | Toon et al. |
| 5,104,912 A | 4/1992 | Hoskin |
| 5,106,423 A | 4/1992 | Clarke |
| 5,125,456 A | 6/1992 | Hutchins et al. |
| 5,195,588 A | 3/1993 | Dave |
| 5,280,078 A | 1/1994 | Gregor et al. |
| 5,349,118 A | 9/1994 | Davidovits |
| 5,356,579 A | 10/1994 | Jennings et al. |
| 5,382,371 A | 1/1995 | Stahl et al. |
| 5,398,759 A | 3/1995 | Rodrigues et al. |
| 5,539,140 A | 7/1996 | Davidovits |
| 5,626,665 A | 5/1997 | Barger et al. |
| 5,635,292 A | 6/1997 | Jennings et al. |
| 5,637,412 A | 6/1997 | Jennings et al. |
| 5,747,065 A * | 5/1998 | Lee et al. ................... 424/448 |
| 5,788,762 A | 8/1998 | Barger et al. |
| 5,891,364 A | 4/1999 | Incorvia, Jr. et al. |
| 5,919,739 A | 7/1999 | Sunde et al. |
| 5,979,557 A | 11/1999 | Card et al. |
| 6,030,928 A | 2/2000 | Stahl et al. |
| 6,071,436 A | 6/2000 | Incorvia |
| 6,073,694 A | 6/2000 | Crawshaw |
| 6,110,271 A | 8/2000 | Skaggs et al. |
| 6,239,183 B1 | 5/2001 | Farmer et al. |
| 6,284,714 B1 | 9/2001 | Bland et al. |
| 6,312,515 B1 | 11/2001 | Barlet-Gouedard et al. |
| 6,435,277 B1 | 8/2002 | Qu et al. |
| 6,506,710 B1 | 1/2003 | Hoey et al. |
| 6,613,720 B1 * | 9/2003 | Feraud ...................... C09K 8/62 166/300 |
| 6,696,035 B2 | 2/2004 | Dastol et al. |
| 6,703,352 B2 | 3/2004 | Dahayanake et al. |
| 6,729,405 B2 | 5/2004 | DiLullo et al. |
| 6,848,505 B2 | 2/2005 | Richard et al. |
| 6,927,194 B2 | 8/2005 | Burts, III et al. |
| 6,932,158 B2 | 8/2005 | Burts, III et al. |
| 6,933,038 B2 | 8/2005 | Nanko et al. |
| 6,939,833 B2 | 9/2005 | Burts, III et al. |
| 6,997,261 B2 | 2/2006 | Burts, III et al. |
| 7,013,973 B2 | 3/2006 | Danican et al. |
| 7,060,661 B2 | 6/2006 | Dobson, Sr. et al. |
| 7,111,683 B2 | 9/2006 | Nelson et al. |
| 7,128,148 B2 | 10/2006 | Eoff et al. |
| 7,303,018 B2 | 12/2007 | Cawiezel et al. |
| 7,316,275 B2 * | 1/2008 | Wang et al. .................. 166/300 |
| 7,343,976 B2 | 3/2008 | Segura |
| 7,393,407 B2 | 7/2008 | Dingsoyr et al. |
| 7,470,419 B2 | 12/2008 | Hansen |
| 7,510,009 B2 | 3/2009 | Cawiezel et al. |
| 7,784,541 B2 | 8/2010 | Hartman et al. |
| 7,789,146 B2 | 9/2010 | Panga et al. |
| 2002/0040812 A1 | 4/2002 | Heying |
| 2002/0157575 A1 | 10/2002 | DiLullo et al. |
| 2004/0023815 A1 | 2/2004 | Burts, III et al. |
| 2004/0194960 A1 | 10/2004 | DiLullo et al. |
| 2005/0172864 A1 | 8/2005 | Dingsoyr et al. |
| 2005/0230113 A1 | 10/2005 | Eoff et al. |
| 2006/0030493 A1 * | 2/2006 | Segura ................... C09K 8/685 507/244 |
| 2006/0084580 A1 | 4/2006 | Santra et al. |
| 2006/0169455 A1 | 8/2006 | Everett et al. |
| 2006/0211580 A1 | 9/2006 | Wang et al. |
| 2006/0234871 A1 * | 10/2006 | Dalrymple et al. .......... 507/211 |
| 2006/0289158 A1 | 12/2006 | Reddy et al. |
| 2007/0181039 A1 | 8/2007 | Yamamoto et al. |
| 2007/0181042 A1 | 8/2007 | Masanaga et al. |
| 2007/0254018 A1 | 11/2007 | Kuhns |
| 2008/0003128 A1 | 1/2008 | Hansen |
| 2008/0028994 A1 | 2/2008 | Barlet-Gouedard et al. |
| 2008/0060811 A1 * | 3/2008 | Bour ...................... C04B 26/04 166/291 |
| 2008/0108524 A1 | 5/2008 | Willberg et al. |
| 2008/0178769 A1 | 7/2008 | Goodwin et al. |
| 2008/0223596 A1 | 9/2008 | Ezell et al. |
| 2010/0155371 A1 | 6/2010 | Gentsch |
| 2010/0155372 A1 | 6/2010 | Battisti et al. |
| 2010/0239644 A1 | 9/2010 | Feldstein et al. |
| 2010/0243250 A1 | 9/2010 | Panga et al. |
| 2010/0300688 A1 | 12/2010 | Panga et al. |
| 2012/0132422 A1 | 5/2012 | Mirakyan et al. |
| 2012/0138294 A1 | 6/2012 | Sullivan et al. |
| 2013/0116156 A1 | 5/2013 | Lin et al. |
| 2013/0319670 A1 * | 12/2013 | Lin et al. ...................... 166/282 |
| 2014/0076563 A1 * | 3/2014 | Lin et al. ...................... 166/295 |

FOREIGN PATENT DOCUMENTS

| | | |
|---|---|---|
| EP | 0659702 B1 | 7/1998 |
| EP | 0866779 B1 | 3/2000 |
| EP | 0521376 B1 | 4/2000 |
| EP | 1653043 A1 | 5/2006 |
| EP | 1725508 B1 | 2/2008 |
| EP | 1887065 A1 | 2/2008 |
| EP | 1534646 B1 | 8/2008 |
| GB | 2056964 A | 3/1981 |
| GB | 2179933 A | 3/1987 |
| GB | 2212489 A | 7/1989 |
| GB | 2216511 A | 10/1989 |
| RU | 2133337 C1 | 7/1999 |
| RU | 2138629 C1 | 9/1999 |
| WO | 95/03995 | 2/1995 |
| WO | 97/20900 | 6/1997 |
| WO | 97/22564 | 6/1997 |
| WO | 98/01509 | 1/1998 |
| WO | 03/106368 | 12/2003 |

(56) References Cited

FOREIGN PATENT DOCUMENTS

| WO | 2004016906 A1 | 2/2004 |
|---|---|---|
| WO | 2005/087684 | 9/2005 |
| WO | 2005/087685 | 9/2005 |
| WO | 2006/009455 | 1/2006 |
| WO | 2008/017414 | 2/2008 |
| WO | 2009/019471 | 2/2009 |
| WO | 2009/074658 | 6/2009 |
| WO | 2011/012921 | 2/2011 |
| WO | 2011/012922 | 2/2011 |
| WO | 2012075154 A1 | 6/2012 |

OTHER PUBLICATIONS

Chatterjee et al., "Study of copolymer-copolymer interactions and formation of intermacromolecular complexes," Journal of Polymer Science, vol. 22, Dec. 16, 1983, pp. 3697-3703.*

Gao, "Viscosity of partially hydrolyzed polyacrylamide under shearing and heat," Journal of Petroleum Exploration and Production Technology, vol. 3, 2013, pp. 203-206.*

Aften C: "Study of Friction Reducers for Recycled Stimulation Fluids in Environmentally Sensitive Regions," paper SPE 138984 presented at Spe Eastern Regional Meeting held in Morgantown, West Virginia, Oct. 12-14, 2010.

Daccord G, Craster B, Ladva H, Jones TGJ and Manescu G: "Cement-Formation Interactions," in Nelson E. and Guillot D. (eds.): Well Cementing-2nd Edition, Houston: Schlumberger (2006): 202-219.

Ikegami A and Imai N: "Precipitation of Polyelectrolytes by Salts," J. Polymer Science 1962, 56, 133-152.

Levitt DB. and Pope GA: "Selection and Screening of Polymers for Enhanced-Oil Recovery," paper SPE 113845 presented at the 2008 SPE/DOE Improved Oil Recovery Symposium held in Tulsa, OK Apr. 19-23, 2008.

Abshire et al., "Offshore Permanent Well Abandonment", Schlumberger Oilfield Review Magazine, Spring 2012, vol. 24, No. 1, pp. 42-50.

Borling et al., "Pushing Out the Oil with Conformance Control", Schlumberger Oilfield Review Magazine, Apr. 1994, vol. 6, No. 2, pp. 44-58.

C. Marca: "Remedial Cementing," in Nelson EB and Guillot D (eds.): Well Cementing-2nd Edition, Houston: Schlumberger (2006): 503-549.

Schlumberger Publication FE_03_002_2, "CHDT Cased Hole Dynamics Tester," Jun. 2003, 6 pages.

"Software estimates chemical, physical properties", Chemical & Engineering News, vol. 63(5), 1985, p. 27.

Umana et al., "Preparation of new membranes by complex formation of itaconic-acrylamide copoylymer with polyvinylpyrrolidone: studies on gelation mechanism by light scattering", J. Membr. Sci., vol. 157, Apr. 21, 1998, pp. 35-96.

International Search Report and Written Opinion issued in International Patent Application No. PCT/EP2013/060954 dated Aug. 26, 2013; 13 pages.

International Search Report and Written Opinion issued in International Patent Application No. PCT/US2011/062653 dated Mar. 9, 2012; 14 pages.

International Search Report and Written Opinion issued in International Patent Application No. PCT/US2011/062666 dated Mar. 9, 2012; 14 pages.

International Search Report and Written Opinion issued in International Patent Application No. PCT/US2013/060259 dated Feb. 18, 2014; 13 pages.

* cited by examiner

METHODS FOR SERVICING SUBTERRANEAN WELLS

CROSS REFERENCE TO RELATED APPLICATIONS

This application is a Continuation in Part of United States Patent Application 2013/0233551 filed on Sep. 4, 2012 and of United States Patent Application 2012/0138294 that was filed Nov. 21, 2011, this application also claims priority to and the benefit of Provisional Application U.S. 61/418,211, filed Nov. 30, 2010, which all being hereby incorporated herein by reference in their entirety.

BACKGROUND

The statements in this section merely provide background information related to the present disclosure and may not constitute prior art.

This disclosure relates to methods for controlling lost circulation in subterranean wells, in particular, fluid compositions and methods for operations during which the fluid compositions are pumped into a wellbore, enter voids in the subterranean-well formation through which wellbore fluids escape, and form a seal that limits further egress of wellbore fluid from the wellbore.

During construction of a subterranean well, drilling and cementing operations are performed that involve circulating fluids in and out of the well. The fluids exert hydrostatic and pumping pressure against the subterranean rock formations, and may induce a condition known as lost circulation. Lost circulation is the total or partial loss of drilling fluids or cement slurries into highly permeable zones, cavernous formations and fractures or voids. Such openings may be naturally occurring or induced by pressure exerted during pumping operations. Lost circulation should not be confused with fluid loss, which is a filtration process wherein the liquid phase of a drilling fluid or cement slurry escapes into the formation, leaving the solid components behind.

Lost circulation can be an expensive and time-consuming problem. During drilling, this loss may vary from a gradual lowering of the mud level in the pits to a complete loss of returns. Lost circulation may also pose a safety hazard, leading to well-control problems and environmental incidents. During cementing, lost circulation may severely compromise the quality of the cement job, reducing annular coverage, leaving casing exposed to corrosive downhole fluids, and failing to provide adequate zonal isolation. Lost circulation may also be a problem encountered during well-completion and workover operations, potentially causing formation damage, lost reserves and even loss of the well.

Lost-circulation solutions may be classified into three principal categories: bridging agents, surface-mixed systems and downhole-mixed systems. Bridging agents, also known as lost-circulation materials (LCMs), are solids of various sizes and shapes (e.g., granular, lamellar, fibrous and mixtures thereof). They are generally chosen according to the size of the voids or cracks in the subterranean formation (if known) and, as fluid escapes into the formation, congregate and form a barrier that minimizes or stops further fluid flow. Surface-mixed systems are generally fluids composed of a hydraulic cement slurry or a polymer solution that enters voids in the subterranean formation, sets or thickens, and forms a seal that minimizes or stops further fluid flow. Downhole-mixed systems generally consist of two or more fluids that, upon making contact in the wellbore or the lost-circulation zone, form a viscous plug or a precipitate that seals the zone.

A thorough overview of LCMs, surface-mixed systems and downhole-mixed systems, including guidelines for choosing the appropriate solution for a given situation, is presented in the following reference: Daccord G, Craster B, Ladva H, Jones TGJ and Manescu G: "Cement-Formation Interactions," in Nelson E and Guillot D (eds.): *Well Cementing-$2^{nd}$ Edition*, Houston: Schlumberger (2006): 202-219.

SUMMARY

The present disclosure provides means to seal voids and cracks in subterranean-formation rock, thereby minimizing or stopping fluid flow into the formation rock from a wellbore.

In an aspect, embodiments relate to methods for controlling lost circulation in a subterranean well. A process fluid composition is prepared that comprises at least 1 wt % polyacrylamide, a non-metallic crosslinker and a pH adjustment agent. The composition is pumped down the wellbore and into at least one lost circulation zone. The composition is exposed to water and allowed to react with the water and form a gel, thereby blocking the lost circulation zone.

In a further aspect, embodiments relate to methods for controlling lost circulation in a subterranean well. A process fluid is prepared that comprises water, less than 1 wt % polyacrylamide, a non-metallic crosslinker and a pH adjustment agent. The composition is pumped down the wellbore and into at least one lost circulation zone, thereby establishing a filtration process between the wellbore and the lost circulation zone. Water is allowed to flow out of the wellbore and into the lost circulation zone, thereby forming a filter cake at the lost circulation zone interface. As water flows into the lost circulation zone, the polyacrylamide concentration in the filter cake rises above 1 wt %. The polyacrylamide is allowed to crosslink, converting the filter cake into a barrier that seals the lost circulation zone.

DETAILED DESCRIPTION

Figure 1:
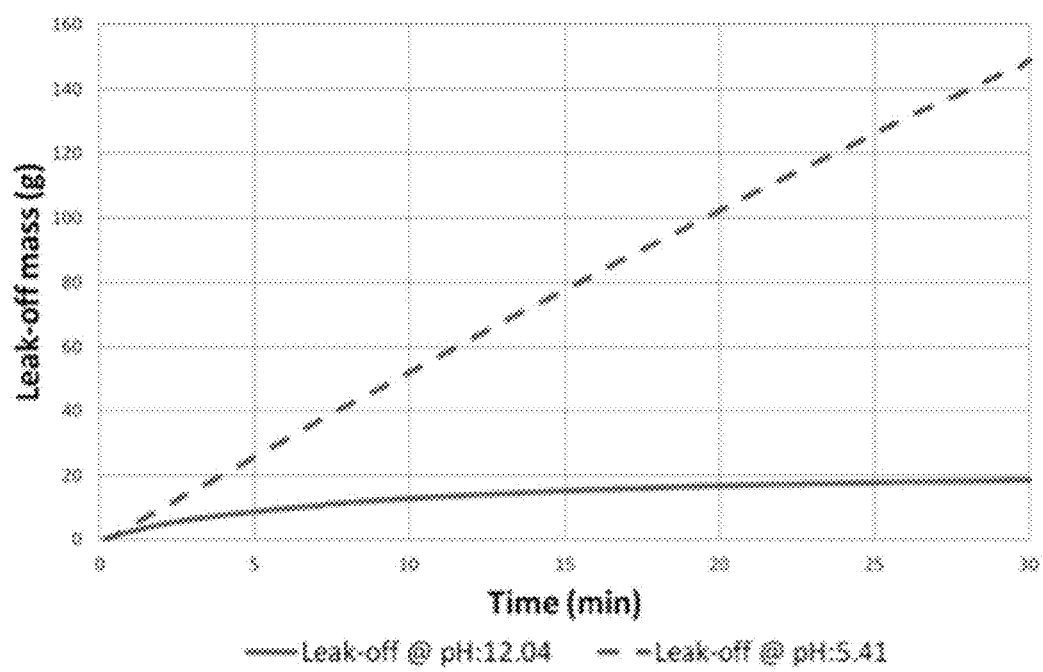
FIG. 1 presents the fluid-loss behavior of an aqueous polyacrylamide-polyvinylpyrrolidone solution at pH 5.41 and pH 12.04.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and the detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood the Applicant appreciates and understands that any and all data points within the range are to be considered to have been specified, and that the Applicant possessed knowledge of the entire range and all points within the range.

The following definitions are provided in order to aid those skilled in the art to understand the detailed description.

The term "treatment," or "treating," refers to any subterranean operation that uses a fluid in conjunction with a desired function and/or for a desired purpose. The term "treatment," or "treating," does not imply any particular action by the fluid.

As used herein, the term "polymer" or "oligomer" is used interchangeably unless otherwise specified, and both refer to homopolymers, copolymers, interpolymers, terpolymers, and the like. Likewise, a copolymer may refer to a polymer comprising at least two monomers, optionally with other monomers. When a polymer is referred to as comprising a monomer, the monomer is present in the polymer in the polymerized form of the monomer or in the derivative form of the monomer. However, for ease of reference the phrase comprising the (respective) monomer or the like is used as shorthand.

As used herein, the term "process fluid" refers to a pumpable fluid that may be circulated in a subterranean well. Such fluids may include drilling fluids, cement slurries, spacer fluids, pills, chemical washes, completion fluids, fracturing fluids, gravel-pack fluids and acidizing fluids. Those skilled in the art will recognize that pumpable fluids may have viscosities lower than about 1000 cP at a shear rate of 100 $s^{-1}$.

As used herein, the term "gel" refers to a solid or semi-solid, jelly-like composition that can have properties ranging from soft and weak to hard and tough. The term "gel" refers to a substantially dilute crosslinked system, which exhibits no flow when in the steady-state, which by weight is mostly liquid, yet behaves like a solid due to a three-dimensional crosslinked network within the liquid. It is the crosslinks within the fluid that give a gel its structure (hardness) and contribute to stickiness. Accordingly, gels are a dispersion of molecules of a liquid within a solid in which the solid is the continuous phase and the liquid is the discontinuous phase. A gel is considered to be present when the Elastic Modulus G' is larger than the Viscous Modulus G," when measured using an oscillatory shear rheometer (such as a Bohlin CVO 50) at a frequency of 1 Hz and at 20° C. The measurement of these moduli is well known to one of minimal skill in the art, and is described in *An Introduction to Rheology*, by H. A. Barnes, J. F. Hutton, and K. Walters, Elsevier, Amsterdam (1997).

The term polyacrylamide refers to pure polyacrylamide homopolymer or copolymer with near zero amount of acrylate groups, a polyacrylamide polymer or copolymer with a mixture of acrylate groups and acrylamide groups formed by hydrolysis and copolymers comprising acrylamide, acrylic acid, and/or other monomers.

This disclosure incorporates process fluids that may comprise polyacylamide crosslinked with a non-metallic crosslinker. The non-metallic crosslinkers do not include metals, but are instead organic molecules, oligomers, polymers, and/or the like. The polyacrylamide may have a weight average molecular weight higher than or equal to about 10,000 g/mol and lower than or equal to about 20 million g/mol, or between about 500,000 g/mol and about 5 million g/mol. The polyacrylamide may have a degree of hydrolysis of from 0% up to less than or equal to about 40%, or from 0.05% up to less than or equal to about 20%, or from 0.1% up to less than or equal to about 15%.

The non-metallic crosslinker may comprise a polylactam. Polylactams include any oligomer or polymer having pendent lactam (cyclic amide) functionality. Polylactams may be homopolymers, copolymers, block-copolymers, grafted polymers, or any combination thereof comprising from 3 to 20 carbon atoms in the lactam functional group pendent to the polymer backbone. Examples include polyalkyl-beta lactams, polyalkyl-gamma lactams, polyalkyl-delta lactams, polyalkyl-epsilon lactams, polyalkylene-beta lactams, polyalkylene-gamma lactams, polyalkylene-delta lactams, polyalkylene-epsilon lactams, and the like. Other examples of polylactams include polyalkylenepyrrolidones, polyalkylenecaprolactams, polymers comprising Vince lactam (2-azabicyclo[2.2.1]hept-5-en-3-one), decyl lactam, undecyl lactam, lauryl lactam, and the like. The alkyl or alkylene substituents in these polymers may include any polymerizable substituent having from 2 to about 20 carbon atoms, e.g., vinyl, allyl, piperylenyl, cyclopentadienyl, or the like. The non-metallic crosslinker may be polyvinylpyrrolidone, polyvinylcaprolactam, or a combination thereof. In the present disclosure, polyvinylpyrrolidone may have a weight average molecular weight higher than or equal to about 10,000 g/mol and less than or equal to about 2 million g/mol, or higher than or equal to 50,000 g/mol and less than or equal to about 2 million g/mol.

Once crosslinking occurs, the process fluid may become a gel.

The Applicant has determined that the disclosed polyacrylamide process fluids have utility in the context of treating lost circulation in subterranean wells. Several techniques may be applied to deliver the process fluids to the lost circulation zone and form barriers that minimize or stop further fluid flow from the wellbore into the lost circulation zone.

A process fluid may be prepared that comprises at least 1 wt % polyacrylamide and a non-metallic crosslinker. The process fluid may have an initial pH between about 3 and about 9. Accordingly, the process fluid may further comprise a pH-adjusting agent. Such agents may comprise a base, an acid, a pH buffer, or any combination thereof. Such agents may comprise alkali metal hydroxides, magnesium oxide, sodium carbonate, sulfuric acid, an organic acid, carbon dioxide or a combination thereof. The pH-adjusting agent may be added in sufficient quantity to raise the fluid pH to a level higher than or equal to 11, or lower than or equal to 1. The process fluid may comprise a drilling fluid, a pill, a cement slurry, a displacement fluid or a gravel-pack fluid. The process fluid may be water-base, oil-base, a water-in-oil emulsion or an oil-in-water emulsion.

The process fluid may be pumped downhole into at least one lost circulation zone, whereupon the polyacrylamide crosslinks and forms a barrier that minimizes or stops further fluid flow from the wellbore into the lost circulation zone.

The rate at which the crosslinking reaction proceeds may be controlled. For example, the polyacrylamide and non-metallic crosslinker may be placed downhole in separate streams. The streams may commingle in the lost circulation zone and crosslinking commences, forming the barrier. Another technique may be to prepare the crosslinked polyacrylamide gel in advance and freeze dry the gel. The freeze-dried gel may then be incorporated into the process fluid and placed into the lost circulation zone. At this point, formation water from the lost circulation zone may hydrate the freeze-dried gel particles, thereby forming the barrier. One may control the rate at which the freeze-dried gel dissolves and hydrates by varying the particle size of the gel particles. In yet another technique, the freeze-dried particles may be added to an oil-base drilling fluid. When pumped into a lost circulation zone, the particles may encounter formation water and may commence hydrating and forming a barrier. In yet another technique, solid polyacrylamide, non-metallic crosslinker and pH adjustment material may be added to an oil-base process fluid. When the suspended polyacrylamide, non-metallic crosslinker and pH adjustment material encounter formation water in a lost circulation zone, hydration and crosslinking may commence and thereby form a barrier.

Yet another technique for controlling gel formation may be to partition the polyacrylamide, non-metallic crosslinker and pH adjustment material in different phases of an emulsion process fluid. The process fluid may be an oil-in-water emulsion or a water-in-oil emulsion. For example, the pH adjustment material may dissolved in the aqueous phase and the other ingredients dispersed in the oil phase. Those skilled in the art will appreciate that any arrangement of the ingredients may be effective, as long as one of them is in a phase different than the other two. The Applicant envisions several techniques by which the emulsions may be destabilized, thereby triggering the crosslinking reaction and barrier formation. One technique may be to design the emulsion such that it becomes unstable upon contact with formation water in the lost circulation zone. Another technique may be to design the emulsion such that it becomes unstable upon exposure to shear—for example the shear provided by pumping the emulsion through a drill bit. Destabilization of the emulsion may cause the ingredients to commingle, thereby initiating the crosslinking reaction and barrier formation. Yet another technique may be to encapsulate one or more of the ingredients, and incorporate the capsules in the process fluid. The capsule coating may be degraded inside the lost circulation zone by, for example, exposure to heat, pressure, formation water or other changes in chemical environment known in the art. The coating may also be degraded by, for example, exposure to shear, ultrasonic vibration, x-ray or gamma-ray irradiation, microwave irradiation or other electromechanical stimuli known in the art.

Yet another technique for controlling gel formation may be to prepare a process fluid that comprises water, less than 1 wt % polyacrylamide, a non-metallic crosslinker and a pH adjustment agent. Crosslinking may not occur in solutions with such low polyacrylamide concentrations. When the process fluid is pumped into a lost circulation zone, a filtration process may be initiated whereby the water escapes into the formation, leaving the polymer and crosslinker behind. As the polyacrylamide and non-metallic crosslinker accumulate at the interface between the wellbore and the lost circulation zone, the polyacrylamide concentration may exceed 1 wt % in the resulting filter cake. Such a condition may allow the initiation of crosslinking, thereby forming a barrier that prevents further escape of fluids from the wellbore into the lost circulation zone. The filtration process and the initiation of crosslinking may be further enhanced by incorporating fibers in the process fluid. As the fibers accumulate at the lost-circulation zone, the resulting fiber mat may act as a filtration medium.

For all of the techniques described above, the efficiency of barrier formation may be enhanced by including lost circulation materials (LCMs) in the process fluid. As discussed earlier, LCMs may comprise granular, lamellar and fibrous substances. Granular materials may comprise nutshells, plastic beads, limestone particles, sulfur particles, expanded perlite or cottonseed hulls and combinations thereof. The particle size of the granular materials may be between about 10 µm and 10,000 µm, or may be between about 100 µm and 1000 µm. The concentration of the granular materials may vary between about 2.85 kg/m$^3$ and 428 kg/m$^3$ (1 lbm/bbl and 150 lbm/bbl), or may vary between about 28.5 kg/m$^3$ and 342 kg/m$^3$ (10 lbm/bbl and 120 lbm/bbl). Lamellar materials may comprise cellophane flakes, polyester flakes or mica and combinations thereof. The flake size may vary between about 6 mm×6 mm and about 25 mm×25 mm, or may vary between about 13 mm×13 mm and about 19 mm×19 mm. The concentration of the lamellar materials may vary from about 2.85 kg/m$^3$ and 28.5 kg/m$^3$ (1 lbm/bbl and 10 lbm/bbl), or may vary between about 14.3 kg/m$^3$ and 22.8 kg/m$^3$ (5 lbm/bbl and 8 lbm/bbl). The flakes need not necessarily have a square profile. Fibrous materials may comprise sawdust, prairie hay, tree bark, shredded wood, glass fibers, carbon fibers, nylon fibers, polyvinylalcohol fibers, polylactic acid fibers, polyvinylchloride fibers, polyethylene fibers, polyurethane fibers and combinations thereof. The fiber length may vary between about 1 mm and about 15 mm, or between about 5 mm and 10 mm. The fiber concentration may vary between about 28.5 kg/m$^3$ and about 171 kg/m$^3$ (10 lbm/bbl and 60 lbm/bbl), or may vary from about 57 kg/m$^3$ and about 128 kg/m$^3$ (20 lbm/bbl and 45 lbm/bbl). The fibers may be linear or curved.

For all of the techniques discussed above, the viscosities of the process fluids may be within the pumpable range; i.e., lower than 1000 cP at a shear rate of 1000 s$^{-1}$.

Those skilled in the art will recognize that the treatment of lost circulation envisioned by the Applicant is not necessarily limited to the techniques described above.

In an aspect, embodiments relate to methods for controlling lost circulation in a subterranean well. A process fluid composition is prepared that comprises at least 1 wt % polyacrylamide, a non-metallic crosslinker and a pH adjustment agent. The composition is pumped down the wellbore and into at least one lost circulation zone. The composition is exposed to water and allowed to react with the water and form a gel, thereby blocking the lost circulation zone.

In a further aspect, embodiments relate to methods for controlling lost circulation in a subterranean well. A process fluid is prepared that comprises water, less than 1 wt % polyacrylamide, a non-metallic crosslinker and a pH adjustment agent. The composition is pumped down the wellbore and into at least one lost circulation zone, thereby establishing a filtration process between the wellbore and the lost circulation zone. Water is allowed to flow out of the wellbore and into the lost circulation zone, thereby forming a filter cake at the lost circulation zone interface. As water flows into the lost circulation zone, the polyacrylamide concentration in the filter cake rises above 1 wt %. The polyacrylamide is allowed to crosslink, converting the filter cake into a barrier that seals the lost circulation zone.

Those skilled in the art will also recognize that the process fluid may further comprise one or more viscosifiers. Some non-limiting examples of viscosifiers include (but are not limited to) hydratable gels (e.g. guars, poly-saccharides, xanthan, hydroxy-ethyl-cellulose, etc.), a crosslinked hydratable gel, a viscosified acid (e.g. gel-based), an emulsified acid (e.g. oil outer phase), an energized fluid (e.g. an $N_2$ or $CO_2$ based foam) and viscoelastic surfactants (VES). Additionally, the carrier fluid may be a brine, and/or may include a brine.

The VES may be selected from the group consisting of cationic, anionic, zwitterionic, amphoteric, nonionic and combinations thereof. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

A zwitterionic surfactant of the family of betaines may be used. Exemplary cationic viscoelastic surfactants include amine salts and quaternary ammonium salts. Exemplary amphoteric viscoelastic surfactant systems include for example amine oxides and amidoamine oxides. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide. Suitable anionic surfactants include alkyl sarcosinates.

The process fluid may optionally further comprise additional additives, including fluid loss control additives, gas migration control additives, colloidal-size minerals, corrosion inhibitors, scale inhibitors, catalysts, clay control agents, biocides, friction reducers and combinations thereof and the like.

The placement method may incorporate a variety of techniques known to those skilled in the art. For example, coiled tubing, casing or drillpipe may be used to convey the process fluid into the well. Or, the process fluid may be conveyed to the lost circulation zone by a dump bailer.

The placement method may also incorporate the use of pre- and post-flushes. For example, a high-pH (e.g., >9) or neutral-pH fluid may be pumped ahead of or behind the disclosed process fluids, or both. Such a technique may help prevent the process fluid from flowing too deeply into permeable formations, and confine the process fluid to the near-wellbore region.

EXAMPLES

The following examples serve to better illustrate the present disclosure. All examples employ process fluids comprising the following ingredients: (1) partially hydrolyzed (10%) polyacrylamide (PAM) with a molecular weight of about 5 million, MAGNAFLOC 24 available from Ciba Specialty Chemicals; (2) polyvinylpyrrolidone (PVP) with a molecular weight of 55,000, available from Aldrich Chemicals; and sodium hydroxide.

Example 1

Solid polyacrylamide, polyvinylpyrrolidone and sodium hydroxide were blended in an oil-base mud. The following formulation was used: 50 mL mud, 10.3 g polyacrylamide, 20.6 g polyvinylpyrrolidone and 2.0 g sodium hydroxide. To this suspension, 40 mL of water was added. The water began to dissolve the polymers and sodium hydroxide, resulting in gelation. At ambient temperature, the gel became stronger overnight. After two days, the gel became so elastic that the entire sample could be pulled out of its container by a spatula.

Example 2

An aqueous gel was prepared with the following composition: 3 wt % polyacrylamide, 6% polyvinylpyrrolidone and sufficient sodium hydroxide to raise the pH to 12. The crosslinked gel was then freeze dried for two days in a VirTis benchtop freeze dryer.

When the freeze-dried material was placed in water at ambient temperature, swelling was slow. The suspension was allowed to set overnight, and still consisted of disconnected gel domains. However, when tested at 66° C. (150° F.), the swelling rate was significant enhanced, and a homogeneous gel was obtained after 5 hours.

Example 3

An aqueous gel formulation was prepared with the following composition: 0.6 wt % polyacrylamide and 1.2 wt % polyvinylpyrrolidone. The polyacrylamide was added to water that was agitated by an overhead stirrer. The stirring rate was sufficient to generate a moderate vortex in the water. Next, the polyvinylpyrrolidone was added, and stirring continued for a minimum of one hour or until the polymers were fully dissolved and hydrated. The pH of the gel solution was adjusted by adding a 30-wt % solution of sodium hydroxide to the solution dropwise while monitoring pH changes with a pH probe/meter. The pH was adjusted to 12; however, owing to the low polyacrylamide concentration, no gelation occurred.

Filtration tests were performed to simulate the process of fluid gelation triggered by loss of water to the formation. A 750-mL gel solution was prepared as described above. The sample was split—one part at a native pH of 5.41, the other part adjusted to a pH of 12.04 using sodium hydroxide. A 63.5 mm diameter, 6.35 mm thick (2.5 in.×0.25 in.) ceramic disk with a 5 µm pore size, covered by Fann N8800 special hardened filter paper, was used as the filtration medium.

Each solution was placed in a 500-mL Baroid-type fluid-loss cell, and the cell was pressured to 2.1 MPa (300 psi) with nitrogen gas. The fluid that emanated from the cell was captured over a 30-minute period and its weight was recorded by an electronic balance. The results are shown in FIG. 1. The fluid at pH 5.41 flowed through the filtration medium at a constant rate, suggesting that no filter cake formed to resist further flow. However, at pH 12.04, the flow rate reached a plateau, suggesting that a filter cake formed that was sufficient to significantly slow the rate at which the solution flowed through the filtration medium.

At the end of the test, the fluid-loss cell was opened and any remaining fluid was poured out of the cell. The disk and filter paper were visually examined for an indication that a crosslinked gel had formed on the filter paper. The remaining fluid at pH 5.41 flowed easily; however a thick gel was observed on the filter paper at pH 12.04.

Example 4

The tests described in Example 3 were repeated; however, this time the test fluids contained FORM-A-BLOK fibers, available from MI-SWACO, at a concentration of 114 kg/m$^3$ (40 lbm/bbl). Three fluids were tested: water, the gel composition of Example 3 at pH 8 and the gel composition of Example 3 at pH 12.

Figure 2:
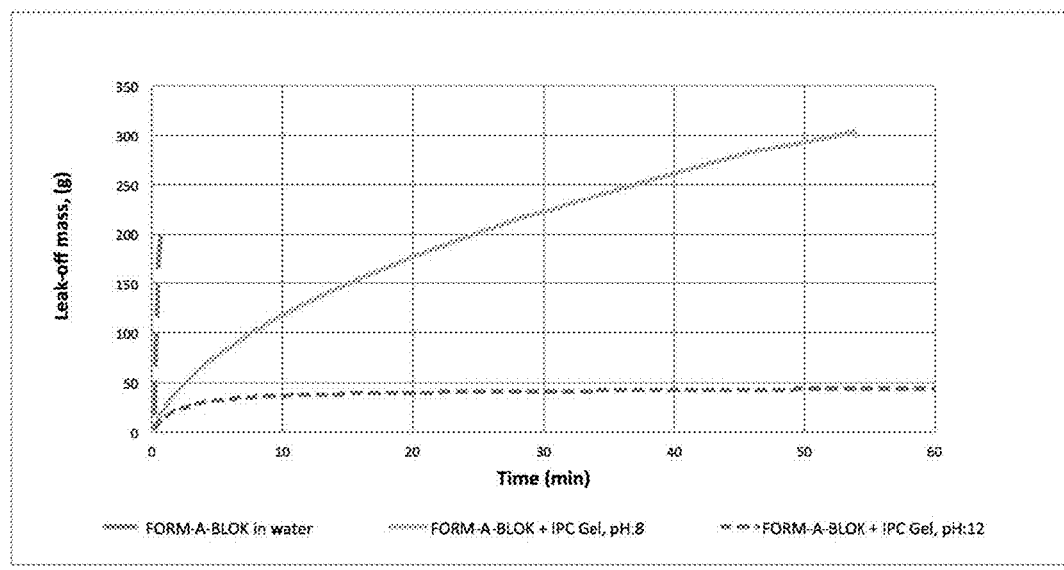
FIG. 2 presents the fluid-loss behavior of an aqueous polyacrylamide-polyvinylpyrrolidone solution containing fibers. Measurements were acquired at two fluid pHs: 8 and 12.

In each case 300 mL of fiber-laden fluid was placed in the 500-mL pressure fluid-loss cell containing a 60-μm pore size ceramic disk. The rates at which the fluids passed through the filtration medium at 2.1 MPa are shown in FIG. 2. In the figure, IPC denotes the polyacrylamide/polyvinylpyrrolidone gel system. The durations of the filtration tests were up to 60 min.

In the absence of polyacrylamide and polyvinylpyrrolidone, the water passed through the filtration medium within less than one minute, indicating that the fibers alone have little or no ability to control filtration. Improved filtration control was observed when the IPC system was present as pH 8. Filtration was essentially stopped within 10 minutes when the IPC system was present at pH 12. Inspection of the pH-12 filter cake revealed a thin, elastic fiber-laden barrier.

Example 5

The rheological properties of the gel systems before and after filtration were measured. The measurement apparatus was a Bohlin Rheometer.

Figure 3:
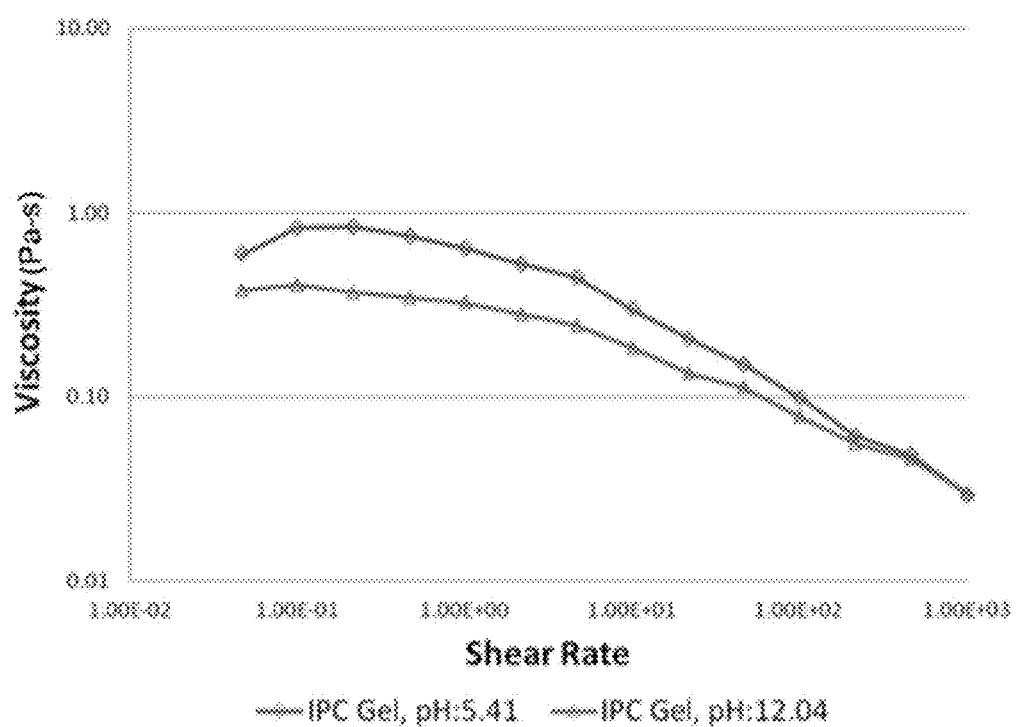
FIG. 3 presents the viscosities of an aqueous polyacrylamide-polyvinylpyrrolidone solution at pH 5.41 and pH 12.04.

FIG. 3 shows the initial gel viscosities versus constant shear rate for the fluids prepared at pH 5.41 and 12.04 (Example 3). The rheometer was fitted with the C25 cup and bob geometry.

Figure 4:
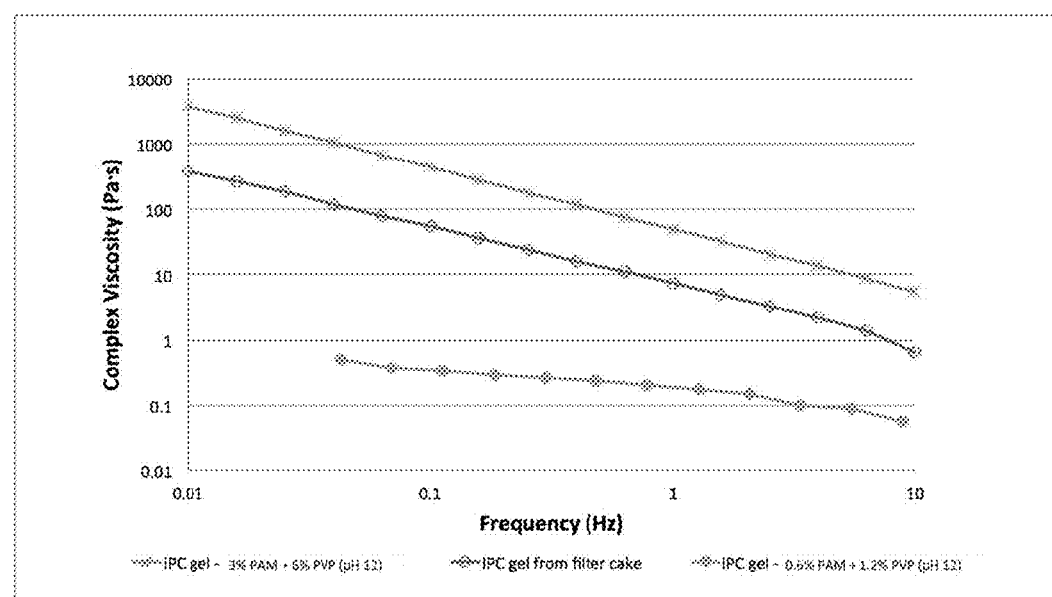
FIG. 4 presents the complex viscosities of an aqueous polyacrylamide-polyvinylpyrrolidone solution in a filter cake following a filtration process.

FIG. 4 shows the complex viscosities of the fluids collected from the filter paper as well as the initial gel at pH 12. The rheometer was operated in oscillatory mode using a parallel plate (PP40) geometry. The viscosities of the fluids recovered from the filter cake were significantly higher. The Applicant does not wish to be held to any specific theory; however, the results are consistent with an increase in polymer concentration in the filter cake resulting from filtration during the test.

Although various embodiments have been described with respect to enabling disclosures, it is to be understood that the preceding information is not limited to the disclosed embodiments. Variations and modifications that would occur to one of skill in the art upon reading the specification are also within the scope of the disclosure, which is defined in the appended claims.

The invention claimed is:

1. A method for controlling lost circulation while drilling or cementing a subterranean well having a wellbore and at least one lost circulation zone, comprising:
   i. preparing a process fluid composition comprising at least 1 wt % polyacrylamide, a non-metallic crosslinker and a pH adjustment agent, wherein the process fluid is an oil-in-water emulsion or a water-in-oil emulsion, and the polyacrylamide resides in one phase of the emulsion and the crosslinker resides in another phase of the emulsion;
   ii. pumping the composition down the wellbore and into the at least one lost circulation zone;
   iii. exposing the composition to formation water in the lost circulation zone, thereby breaking the emulsion and causing the polyacrylamide and the crosslinker to commingle; and
   iv. causing the composition to react and form a crosslinked gel in the formation, thereby blocking the lost circulation zone and preventing further egress of the process fluid from the wellbore into the lost circulation zone;
   wherein, the non-metallic crosslinker comprises a polylactam, and the pH adjustment agent is present in a quantity sufficient to raise a pH of the process fluid to about 12.

2. The method of claim 1, wherein the non-metallic crosslinker comprises polyvinylpyrrolidone, polyvinylcaprolactam or a combination thereof.

3. The method of claim 2, wherein the polyvinylpyrrolidone has a weight average molecular weight of greater than or equal to 50,000 g/mol and less than or equal to 2 million g/mol.

4. The method of claim 1, wherein the non-metallic crosslinker has a weight average molecular weight greater than or equal to 10,000 g/mol and less than or equal to 2 million g/mol.

5. The method of claim 1, wherein the polyacrylamide has a degree of hydrolysis higher than or equal to 0% and lower than or equal to 40%.

6. The method of claim 1, wherein the molecular weight of the polyacrylamide is between 10,000 g/mol and 20 million g/mol.

* * * * *